United States Patent
Campbell et al.

[15] 3,664,192
[45] May 23, 1972

[54] DEW POINT HYGROMETERS

[72] Inventors: Curtis B. Campbell; Ben L. Grover, both of Logan, Utah

[73] Assignee: Utah State University

[22] Filed: Sept. 8, 1969

[21] Appl. No.: 856,037

[52] U.S. Cl. ............................................................73/336.5
[51] Int. Cl. ........................................................G01n 25/66
[58] Field of Search ..........................73/336.5, 17 A; 338/35

[56] References Cited

UNITED STATES PATENTS

| | | | |
|---|---|---|---|
| 2,554,440 | 5/1951 | Coburn | 338/35 |
| 2,756,295 | 7/1956 | Schluchter | 73/336.5 |
| 3,465,591 | 9/1969 | Bachem | 73/17 |

OTHER PUBLICATIONS

" The Mode of Operation of Saturated Temperature Hygrometers Based on Electrical Detection of a Salt-solution Phase Transition" an article in Humidity and Moisture, Volume 1, Principles and Methods of Measuring Humidity in Gases, Robert E. Ruskin, Editor; Copyright 1965. Copy furnished and made of record by applicant. The article is chapter 63 by Nelson and Amdur particularly pages 619–621

*Primary Examiner*—Louis R. Prince
*Assistant Examiner*—Denis E. Corr
*Attorney*—Clarence W. Martin

[57] ABSTRACT

The invention disclosed herein relates to the measurement of the water vapor content of a gaseous environment and more particularly to the measurement of the water vapor content of the atmosphere by means of a hygroscopic salt exposed to the atmosphere. The salt absorbs moisture from, or releases moisture to, the atmosphere as a function of the water vapor content of the atmosphere and the temperature to which the salt is heated. Heat is supplied to the hygroscopic salt to a greater or lesser degree in response to changes in the resistivity of the salt and these changes in resistivity are relatively large with relatively small variations in the amount of water absorbed by the salt at its lower percentages of water absorption. The temperature required to maintain the hygroscopic salt at its preselected resistivity and resultant low degree of water content is in direct relationship to the dew point or water vapor content of the atmosphere.

8 Claims, 1 Drawing Figure

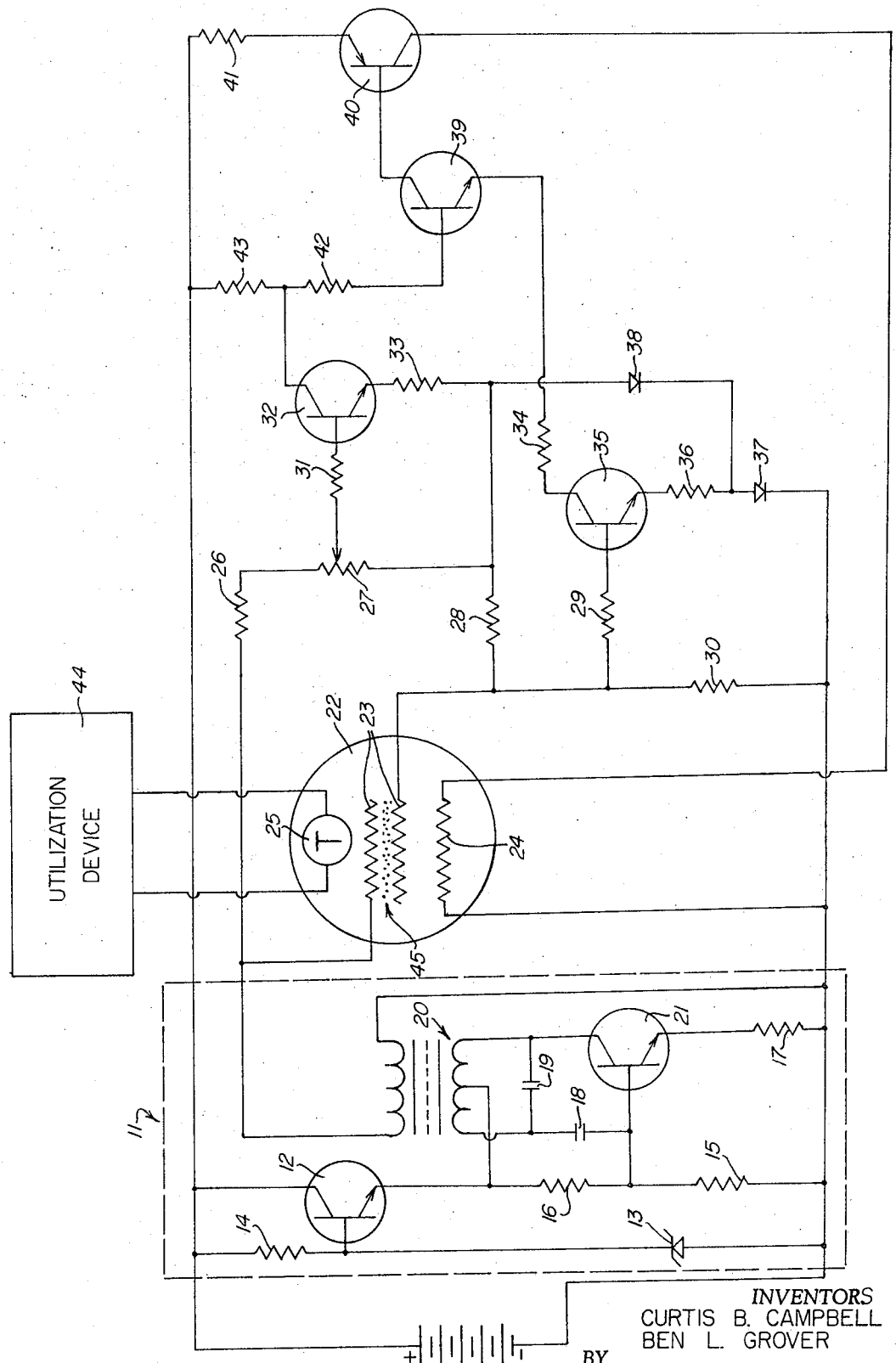
PATENTED MAY 23 1972
3,664,192
INVENTORS
CURTIS B. CAMPBELL
BEN L. GROVER
AGENT

DEW POINT HYGROMETERS

In the study of micro-meterology, generally, it is desirable to have a device that will accurately detect small fluctuations in the water vapor content of the atmosphere. Such a device, in addition to being relatively accurate, should be compact, relatively inexpensive to manufacture and operate, and should operate on almost any available electrical power source with a minimum power requirement.

Such a device is herein disclosed.

The sensor unit of the hygrometer is a hygroscopic salt which is heated and exposed to the ambient atmosphere wherein regulation of the heat supplied to the salt causes the salt to absorb moisture from or release moisture to the atmosphere in sufficient quantities to maintain a constant predetermined resistance of the salt. The salt is continually heated to a temperature above that of the ambient atmosphere in order to maintain the salt in a condition of low absorbed water content which in turn causes the salt to be highly hygroscopic and the resistivity of the salt to be very sensitive to changes in the water vapor content in the atmosphere. Since it is desired to maintain the resistance of the salt at a constant value, the hygrometer is called a constant resistance hygrometer and the sensor element of the hygrometer a constant resistance humidity transducer.

In the presently preferred embodiment of the invention the hygroscopic salt is maintained in a condition of low water content wherein the salt is in equilibrium with an boundary layer relative humidity of less than 11 percent to assure a wide range of sensitive operation for the hygrometer. The temperature required to maintain this condition of equilibrium of the boundary layer between the salt and the atmosphere is indicative of the dew point of the atmosphere since a high water content of the atmosphere would constitute a greater driving force across the boundary layer into the salt and would thus require a higher temperature of the salt to maintain a condition of equilibrium in the boundary layer. Therefore, a very small change in the absorbed water content of the salt will cause a large and easily detectable change in the resistivity of the salt.

The resulting resistivity of the salt at the low degree of water saturation is then balanced against a resistance of known value in such a manner that the current flow resulting from the electrical imbalance in the circuit is appropriately amplified to a greater or lesser degree and utilized in a heating element to raise or lower the temperature of the heated salt such that the salt either absorbs moisture from or releases moisture to the atmosphere to return the salt to its predetermined condition of resistivity.

The temperature to which the salt must be heated to maintain the resistivity of the salt at its preselected level is directly proportional to the water vapor content of the atmosphere. Measurement of this temperature is accomplished by means of a temperature sensor such as a thermistor embedded within the sensor unit of the hygrometer. The temperature signal thus obtained is in direct relationship to the dew point of the atmosphere and can be appropriately processed to record or indicate the dew point directly.

The sensor unit of the hygrometer is sensitive to changes in the moisture content of the atmosphere since the hygroscopic salt is contained in a thin layer on the external surface of the resistance heater. Since the salt layer is relatively thin and placed on the external surface of a relatively small resistance heater, very little electrical power is required to be supplied to the heater to maintain the temperature of the salt at a value which will maintain the resistivity of the salt at a predetermined value. In addition, the radiative and convective heat losses from the transducer are reduced to a minimal value by the small size of the transducer unit which comprises the resistance detector, salt layer, heater, and temperature sensing element.

Electrical energy for the circuitry comprising the hygrometer can be supplied from either a conventional alternating current source or a storage battery with appropriate modifications in the circuit between the source and the hygrometer circuit to comply with the electrical limitations of the hygrometer circuit. In either case, an alternating current must be supplied to the hygroscopic salt resistivity detector which is in electrical contact with the hygroscopic salt since a direct current tends to polarize a hygroscopic salt such as lithium chloride and limit its usefulness as a hygroscopic salt.

It should also be noted that the voltage of the alternating current supplied to the hygroscopic salt resistivity detector circuit must be the same for each given load condition for accuracy in the measurement of humidity using the present system of a constant resistance humidity transducer. Although the voltage will change with each changed load condition, the voltage must be the same voltage whenever the same load condition is encountered.

It is therefore an object of this invention to provide an accurate and sensitive means for determining the water vapor content of the atmosphere.

Another object of this invention is to provide a water vapor detection unit that requires a minimum amount of electrical power for continuous operation.

It is a further object of this invention to provide a water vapor detection unit that will operate on almost any available electrical power source.

These and other objects of this invention will become apparent in the following description of the invention when taken in conjunction with the accompanying drawing.

The drawing is a circuit diagram of a battery electrical power supply for the constant resistance humidity transducer circuit of the dew point hygrometer.

A battery is shown at 10 as a source of direct current for the circuit. An oscillator circuit 11 is indicated by the dashed outline surrounding it and comprises a regulator transistor 12; a Zener diode 13; a voltage dropping resistor 14; resistors 15, 16, and 17; capacitors 18 and 19; an oscillator transformer 20; and an oscillator transistor 21. The base voltage for transistor 12 is fixed by the Zener diode 13 and the resistor 14 with the result that the emitter voltage of transistor 12 is held constant at a value slightly less than the operating voltage of the Zener diode 13.

Resistors 15, 16, and 17 establish the direct current operating conditions for the oscillator transistor 21. These aforementioned components combine with capacitors 18 and 19 and the oscillator transformer 20 to complete a conventional resonant feed-back oscillator circuit. The choice of components and the design of the oscillator circuit 11 is for the purpose of supplying a constant alternating current voltage output from the secondary winding of the oscillator transformer 20 which voltage is the same for each given load condition.

A constant resistance humidity transducer is indicated generally at 22 and comprises a hygroscopic salt resistivity detector or bifilar winding 23 in electrical contact with a hygroscopic salt 45 which salt is in thermal contact with a resistance heater 24 and a temperature sensing element or thermistor 25 which is indicated in the diagram as a T enclosed in a circle.

Alternating current of constant voltage from the secondary winding of the oscillator transformer 20 passes through the bifilar winding 23 whose resistance is determined by the amount of water absorbed by the salt.

Since the resistance of the hygroscopic salt film is variable with variations in the absorbed water content, the voltage across the bifilar winding 23 is also variable. To set or establish a reference voltage across the bifilar winding 23, the humidity transducer 22 is placed in a water vapor environment of known saturation and temperature that is, a known moisture content and the resistance of a potentiometer 27 is adjusted until the desired voltage is maintained across the bifilar winding 23. Once established, the setting on the potentiometer 27 remains fixed.

Transistor 40 is an amplifying transistor which serves as a heater control amplifier for the heater element 24. Transistor 39 is so connected as to act as a minimum series resistance with resistance 34 between a resistance error detector transistor 35 and transistor 40 whenever the resistance of the film of hygroscopic salt is below a preselected value and the voltage across the hygroscopic salt is less than a preselected damping voltage. The damping voltage is adjusted at potentiometer 27. As the voltage across the hygroscopic salt increases from the preselected value adjusted to by potentiometer 27, a signal is fed through transistor 32 to damping control circuitry comprising resistors 43 and 42 changing the conduction of transistor 39. This change in conduction causes transistor 39 to increase in resistance with the result that transistor 39 acts as a variable resistance between the resistance error detector transistor 35, which receives error signals through resistance 29, and the heater control amplifier transistor 40 and in turn aids in preventing excessive power surges to the heater to prevent the heater from large oscillations in the amount of heat supplied to the salt.

When resistance of the salt 45 is low or in a state of increased moisture absorption, transistor 39 is biased to act as a low resistance path for the increased current from transistor 35. However, as the salt 45 dries and its resistance increases, the voltage across the series of resistances comprising 26, 27, and 28 increases and this also increases the voltage applied through resistance 31 to the base of transistor 32 which acts as a damping control transistor. Transistor 32 applies a signal through resistance 42 to the base of transistor 39 which acts as a drive limiting transistor to limit the drive signal to the heat or control amplifier transistor 40.

Therefore, it is obvious that the circuit comprises a damping circuit which permits more accurate and precise measurements than previously obtainable.

Resistor 30 serves as a reference resistance for the resistance of the bifilar winding 23. Resistance 33 establishes the DC operating conditions for transistor 32 and also desensitizes the circuit to variations in transistor characteristics. Resistances 41 and 36 also provide similar functions as that of resistance 33. Diodes 37 and 38 also combine with resistances 36 and 33, respectively, in establishing the DC operating voltages of transistors 35 and 32, respectively.

The temperature of the heater element 24 is detected utilizing a conventional thermistor 25 the signal from which can be utilized in a utilization device 44 to either indicate dew point directly or to record the dew point on a recording instrument.

In the presently preferred embodiment, the humidity transducer is constructed by embedding a thermistor in the hollow core of a cylindrical resistor which serves as the heater element for the hygroscopic salt by using a heat sink compound to assure accurate measurement of the heater element temperature. A thin layer of absorbant material is wrapped about the external curved periphery of the heater element and is wetted with solution of hygroscopic salt comprising 1 part by volume saturated lithium chloride solution and 2 parts water.

We claim:

1. A device for the measurement of water in the atmosphere in a vapor form comprising:
   a. a hygroscopic salt exposed to the atmosphere;
   b. heat means for maintaining the electrical resistance of the hygroscopic salt at a selected predetermined value independent of variations of moisture content of said atmosphere from a known moisture content; and
   c. means for measuring the temperature of said salt required to maintain said resistance of the salt.

2. In a device as defined in claim 1 wherein the hygroscopic salt is lithium chloride.

3. In a device as defined in claim 1 wherein the electrical resistance of the hygroscopic salt is a function of the amount of water absorbed by the salt and including means responsive to change in said predetermined resistance to cause a change in the heat supplied to said salt to thereby return the electrical resistance of said salt to its predetermined state.

4. In a device as defined in claim 1 wherein the hygroscopic salt is electrically heated to a greater degree under conditions of increased water vapor content in the atmosphere to lower the resultant absorbed water content of the salt sufficiently to return the electrical resistance of the salt to its predetermined resistivity.

5. In a device as defined in claim 1 wherein the temperature of the heated salt is measured by means of a temperature measuring means in thermal contact with the electrical resistance heater of the salt and said temperature is utilized as an indication of the degree of water vapor present in the atmosphere.

6. In a device as defined in claim 1 comprising means for maintaining said salt at a temperature wherein the relative humidity of the air at the boundary layer of the salt is less than 11 percent.

7. In a device for the measurement of water in the atmosphere in a vapor form as defined in claim 1 wherein said electrical resistance of said salt is detected by means of a bifilar winding.

8. In a device for the measurement of water in the atmosphere in a vapor form as defined in claim 7 wherein natural polarization of said salt is prevented by the use of an alternating current in said bifilar winding.

* * * * *